United States Patent [19]

Grant

[11] Patent Number: 4,592,522
[45] Date of Patent: Jun. 3, 1986

[54] COAXIAL REEL ASSEMBLY APPARATUS
[75] Inventor: Frederic F. Grant, Bellflower, Calif.
[73] Assignee: Datatape, Inc., Pasadena, Calif.
[21] Appl. No.: 746,497
[22] Filed: Jun. 19, 1985
[51] Int. Cl.$^4$ .................... G03B 1/04; G11B 15/32
[52] U.S. Cl. .................................. 242/193; 242/68.3; 352/156
[58] Field of Search ............... 242/193, 194, 68, 68.1, 242/68.2, 68.3, 72, 72.1, 56.9, 71.2; 352/156

[56] References Cited

U.S. PATENT DOCUMENTS

| | | | |
|---|---|---|---|
| 3,124,319 | 3/1964 | Cohen et al. | 242/68.3 |
| 3,322,364 | 5/1967 | Dekker | 242/68.3 |
| 3,322,365 | 5/1967 | Martin et al. | 242/68.3 |
| 3,561,699 | 2/1971 | Garrett et al. | 242/193 |
| 4,116,401 | 9/1978 | Evert et al. | 242/68.3 |
| 4,121,786 | 10/1978 | Hathaway | 242/193 |
| 4,140,287 | 2/1979 | Hutzenlaub | 242/56.9 |

*Primary Examiner*—Stanley N. Gilreath
*Attorney, Agent, or Firm*—Dennis P. Monteith

[57] ABSTRACT

A reel assembly apparatus for coaxial magnetic tape reels is provided in which both an inboard reel and an outboard reel may be reliably clamped to their respective drive spindles from the outboard side of the assembly apparatus with ease and convenience. For the purpose of clamping the inboard reel, an internal locking nut extends radially in the plane of the inboard reel from its drive spindle into threading engagement with a hub of the inboard reel. A linkage, extending axially through the outboard drive spindle, rotates in response to turning movement of a bail accessible to an operator. The locking nut, in response to the rotation of the linkage, (1) initially causes the inboard hub to rotate, relative to the inboard reel, a limited amount into a reel-clamping position, and (2) then causes an axial movement of the inboard hub. This latter movement drives the inboard reel axially, to clamp it against a radially extending member of the inboard drive spindle. A second locking nut, coupling a second bail to the outboard hub, serves similarly for clamping the outboard reel to its drive spindle. With the locking nuts in the planes of their respective reels, the reels can be positioned axially immediately adjacent each other, thereby conserving space for a compact design.

11 Claims, 6 Drawing Figures

COAXIAL REEL ASSEMBLY APPARATUS

BACKGROUND OF THE INVENTION

1. Field of the Invention

The invention relates to a coaxial reel system. More particularly, the invention relates to a reel assembly apparatus for coaxial magnetic tape reels.

2. Description Relative To The Prior Art

In the magnetic tape recording art, a coaxial supply/take-up reel assembly is particularly convenient if the recording apparatus is of the helical scanning type, because the tape enters a head scanning area at a level that is different from the level at which the tape leaves the scanning area. Even with other recording systems, such as longitudinal recording, it is desirable from the standpoint of saving space, to mount the tape supply reel and tape take-up reel coaxially with respect to each other.

The prior art coaxial reel systems involve rather complicated mechanisms for releasably attaching a pair of reels to their respective spindle drive assemblies. For example, U.S. Pat. No. 3,561,699 discloses coaxial reel apparatus in which each reel is fitted over a corresponding hub having an outer circumferential elastomeric ring. Screw means on the respective hubs cause axial compression of the corresponding elastomeric ring, with the axial compression causing the ring to bulge radially outwardly into engagement with the inner rim of the corresponding reel.

U.S. Pat. No. 3,322,365 discloses an alternate reel mounting arrangement in which rotatable clamping knobs for each of the spindle drive assemblies have a radially extending flange confronting a bevelled surface of the drive spindle, with a resilient elastic ring mounted between the flange and the bevelled surface. The rotating of a knob causes the corresponding flange to move axially to compress the ring, which thereby expands radially outwardly. The ring expands beyond the circumferential edge of the drive spindle to engage the corresponding tape reel, thereby locking the reel to the spindle.

In addition to their complexity, a further disadvantage of coaxial reel systems of the aforementioned type is that the elastomeric material is repeatedly stretched and tends to be weakened by the stretching. Furthermore, when both reels are mounted from the outboard side of the reel system, which is usually the case, the inboard reel may not be readily accessible because of the presence of the outboard reel and the outboard drive spindle. Accordingly, this often means that the outboard reel must be removed in order to make a mounting adjustment of the inboard drive spindle.

A further disadvantage of prior art coaxial reel assemblies, as exemplified by U.S. Pat. No. 3,322,365, is that when both reels are mounted from the outboard side, the mechanism for clamping the inboard reel to its drive spindle is often positioned axially between the adjacent reels. This arrangement prevents the reels from being positioned immediately adjacent each other, and thereby requires space which may not be available with tape recording apparatus of a compact design.

SUMMARY OF THE INVENTION

In view of the foregoing, an object of the invention is to provide a coaxial reel assembly apparatus of simple design and construction in which both reels may be readily clamped to their respective spindle drive mechanisms from the outboard side of the assembly apparatus with ease and convenience. The coaxial reel assembly apparatus is of the type having a first tape reel mounted on a first reel hub for synchronous rotation with an inboard drive spindle located adjacent a tape deck, and having a second tape reel coaxially mounted on a second reel hub for synchronous rotation with an outboard drive spindle located remote from the tape deck. Each tape reel is an "industry-standard" reel which features a central hub opening having at least one radially extending keyway extending axially through the tape reel.

For the purpose of achieving the object of the invention, each hub is mounted for both axial and rotational movement relative to its respective drive spindle. Additionally, each hub has at least one clamping projection adapted for axial passage through a reel keyway during the loading of the tape reels onto their respective hubs from the outboard side of the reel assembly apparatus.

For clamping the inboard reel, the object of the invention is achieved with an internal locking nut extending radially in the plane of the inboard reel from the inboard drive spindle into threading engagement with the hub for the inboard reel. A linkage, extending axially through the outboard drive spindle, rotates in response to turning movement of a bail accessible to an operator. The locking nut, in response to the rotation of the linkage, (1) initially causes the inboard hub to rotate a limited amount relative to the inboard reel, thereby moving the clamping projection of the hub from alignment with a keyway of the reel into a reel-clamping position. With the inboard reel in its reel-clamping position, additional rotation of the linkage, under the influence of the bail, causes the locking nut to drive the inboard hub axially relative to the inboard drive spindle. This axial movement causes the inboard reel to be clamped between a radially extending member of the inboard drive spindle and the clamping projection of the inboard hub.

For the purpose of clamping the outboard reel, a second locking nut extends radially in the plane of the outboard reel from the outboard drive spindle into threading engagement with the hub of the outboard reel. That locking nut, in response to the turning of a second bail, serves similarly for causing a clamping of the outboard reel between a clamping projection of the outboard hub and a radially extending member of the outboard drive spindle.

With the clamping of each reel by means of a corresponding locking nut, each reel is held by a mechanism of simple construction and design, which is not otherwise subject to a loss of compliance over the operational life of the reel assembly apparatus. Furthermore, with each locking nut in the plane of its respective reel, the reels can be clamped immediately adjacent each other, thereby conserving space for a compact design, which is not the case with the aforementioned U.S. Pat. No. 3,322,365. Additionally, by means of the bails, each reel can be readily clamped to its respective drive spindle from the outboard side of the assembly apparatus with ease and convenience.

The invention and its other advantages will become more apparent in the detailed description of a preferred embodiment presented below.

DESCRIPTION OF THE DRAWINGS

The invention will be described with reference to the accompanying drawings, wherein.

DETAILED DESCRIPTION OF A PREFERRED EMBODIMENT

Figure 1:
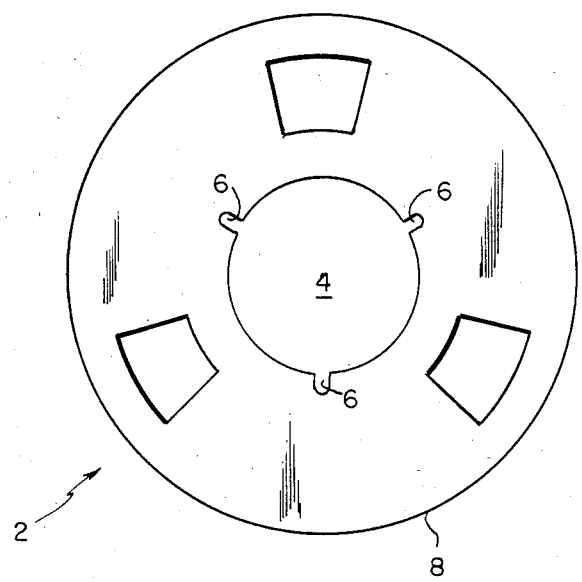
FIG. 1 is an end elevation view showing a magnetic tape reel known in the art.

A coaxial reel assembly apparatus of the invention is adapted to receive a pair of "industry-standard" tape reels. As is shown in FIG. 1, each reel 2 features a central hub opening 4 having three keyways 6 angularly spaced 120 degrees (120°) apart, extending radially from the hub open toward the outer rim 8 of the reel. Any one of the keyways is suitable for receiving a spindle drive member such as a radially extending drive pin. Additionally, each keyway is formed through the full axial dimension of its reel. This permits the passage of each reel freely over a spindle drive pin in either direction, thereby allowing the loading and the unloading of both reels from the same side of the reel assembly apparatus. As a consequence, the inboard reel and the outboard reel are interchangeable.

Figure 2:
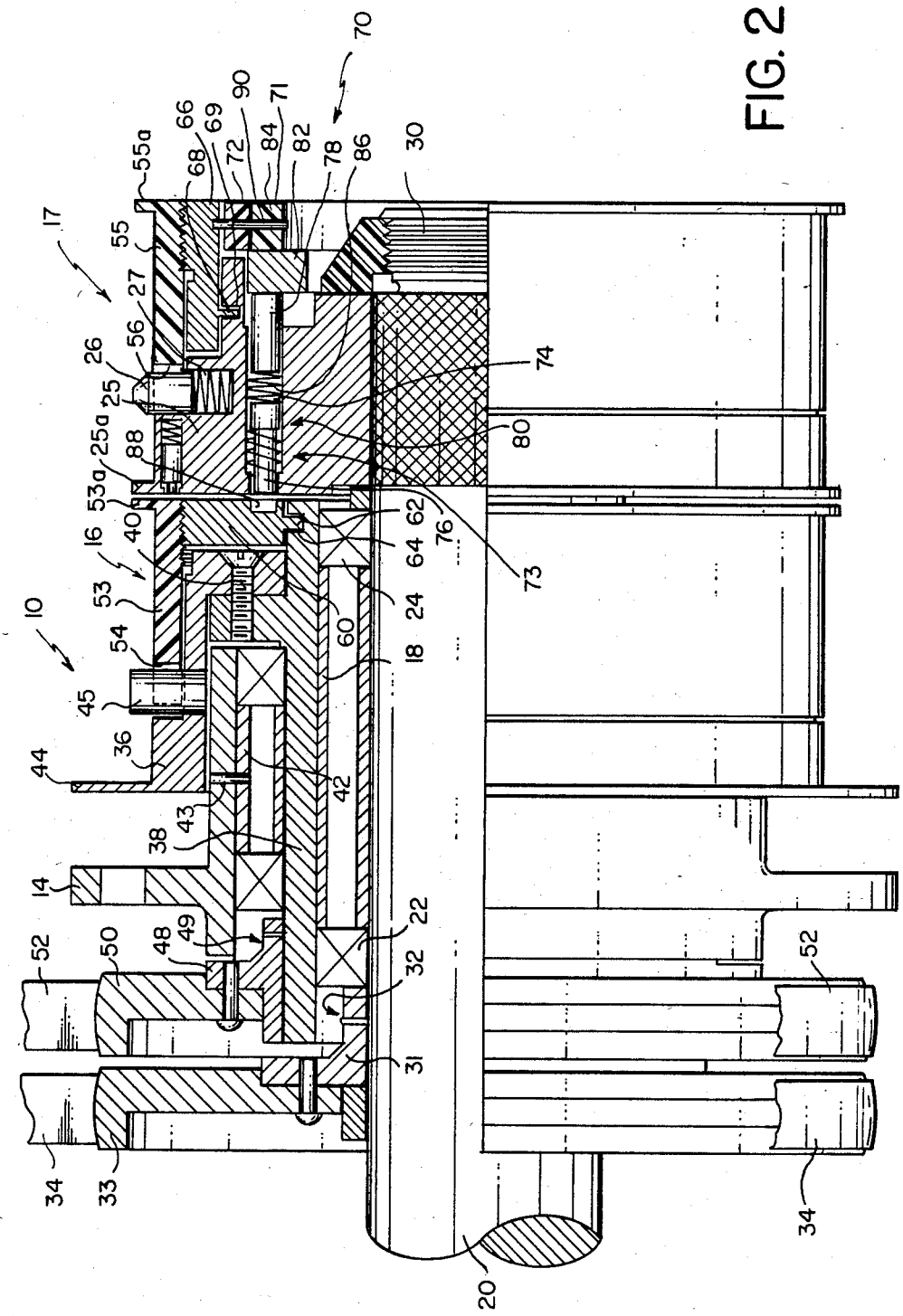
FIG. 2 is an elevation view, partially in cross-section, showing a coaxial reel assembly apparatus according to the present invention.

Referring now to FIG. 2, there is shown coaxial reel assembly apparatus 10 for coaxially mounting a first industry-standard reel (not shown) inboard, adjacent a tape deck 14, and a second "standard" reel (also not shown) outboard, remote from the tape deck. Axially spaced drive spindles 16 and 17, arranged respectively for driving the inboard and outboard reels, are mounted for rotation independently of each other, as follows:

A bearing support element 18 is formed as a hollow cylindrical sleeve with a hollow central shaft 20 rotatable therein by means of ball bearings 22 and 24. The outboard drive spindle 17 includes a rotatable member 25, attached to the knurled outboard end of the shaft 20. Three extensions 25a of the member 25, extending radially at its inboard end, are arranged to pass axially through reel keyways, to permit the inboard reel to be mounted on the drive spindle 16 from the outboard side of the apparatus 10.

The member 25 also carries a bevelled spindle drive pin 26, which serves for rotatably coupling the drive spindle 17 to the outboard reel. For a reason made apparent hereinbelow, the pin 26 is angularly disposed midway between two of the extensions 25a (60 degrees from each extension). A spring 27 biases the pin 26 radially outwardly. The pin 26 is bevelled so that a tape reel moving axially over it depresses the pin against the influence of the spring 27, to permit the loading and unloading of the inboard reel from the outboard side of the apparatus 10.

A member 30, capping the outboard end of the shaft 20, serves to block dirt and other contaminants from the interior of the apparatus 10.

An internal collar 31 is attached to the inboard end of the shaft 20 by means of a pin and slot combination 32. A pulley 33 is secured to the collar 31, to be driven by a belt 34 from a drive means (not shown), to rotate the shaft 20 together with the outboard drive spindle 17.

The inboard drive spindle 16 includes a rotatable member 36 attached to an internal sleeve 38 by screw means 40. The sleeve 38 is mounted for free rotation between the bearing support element 18 and a bearing support element 42. A pin 43 prevents axial movement of the support element 42 relative to the deck 14.

The member 36 has, at its inboard end, a flange 44, which serves as an axial retaining member for the inboard reel. Additionally, the member 36 carries a spindle drive pin 45, which serves for rotatably coupling the drive spindle 16 to the inboard reel.

An intermediate collar 48 is attached to the inboard end of the sleeve 38 by means of a pin and slot combination 49. A pulley 50 is secured to the collar 48, to be driven by a belt 52 from the aforementioned drive means, to rotate the sleeve 38 together with the inboard drive spindle 16.

The above-described structure is the basic structure to which the coaxial reel assembly apparatus of the invention is applied. The invention may also be applied to any similar or equivalent structure whereby axially spaced drive spindles are mounted coaxially for rotation, independently of each other.

An object of the invention is that it be of simple design and construction. To that end, a threaded sleeve 53, which serves as a hub for the inboard reel, is mounted for both rotational movement and axial movement relative to the member 36. For those purposes, the sleeve 53 includes a peripheral notch 54 at its inboard end. The notch 54 extends circumferentially sixty degrees (60°) and is oversized in the axial direction, with respect to the drive pin 45, to permit relative movement between the member 36 and the sleeve.

The sleeve 53 also includes, at its outboard end, three radially extending clamping projections 53a, which serve for clamping the inboard reel against the flange 44. Like the extensions 25a, the clamping projections 53a are spaced 120° apart, and are arranged to pass axially through reel keyways, to permit the loading of the inboard reel from the outboard side of the apparatus 10.

For the purpose of mounting the outboard reel to the drive spindle 17, a threaded sleeve 55 functions as a hub for the outboard reel. To that end, the sleeve 55 is mounted for rotational movement and axial movement relative to the member 25. The sleeve 55 includes a notch 56, which extends circumferentially 60° and which is oversized axially with respect to the drive pin 26, to permit such movement of the sleeve relative to the member 25.

The sleeve 55 carries, at its outboard end, three radially extending clamping projections 55a, which serve for clamping the outboard reel against the extensions 25a. Like the projections 53a, the clamping projections 55a are arranged to pass axially through keyways of the reels, to permit their loading from the outside side of the apparatus.

Figures 3, 4, 5:
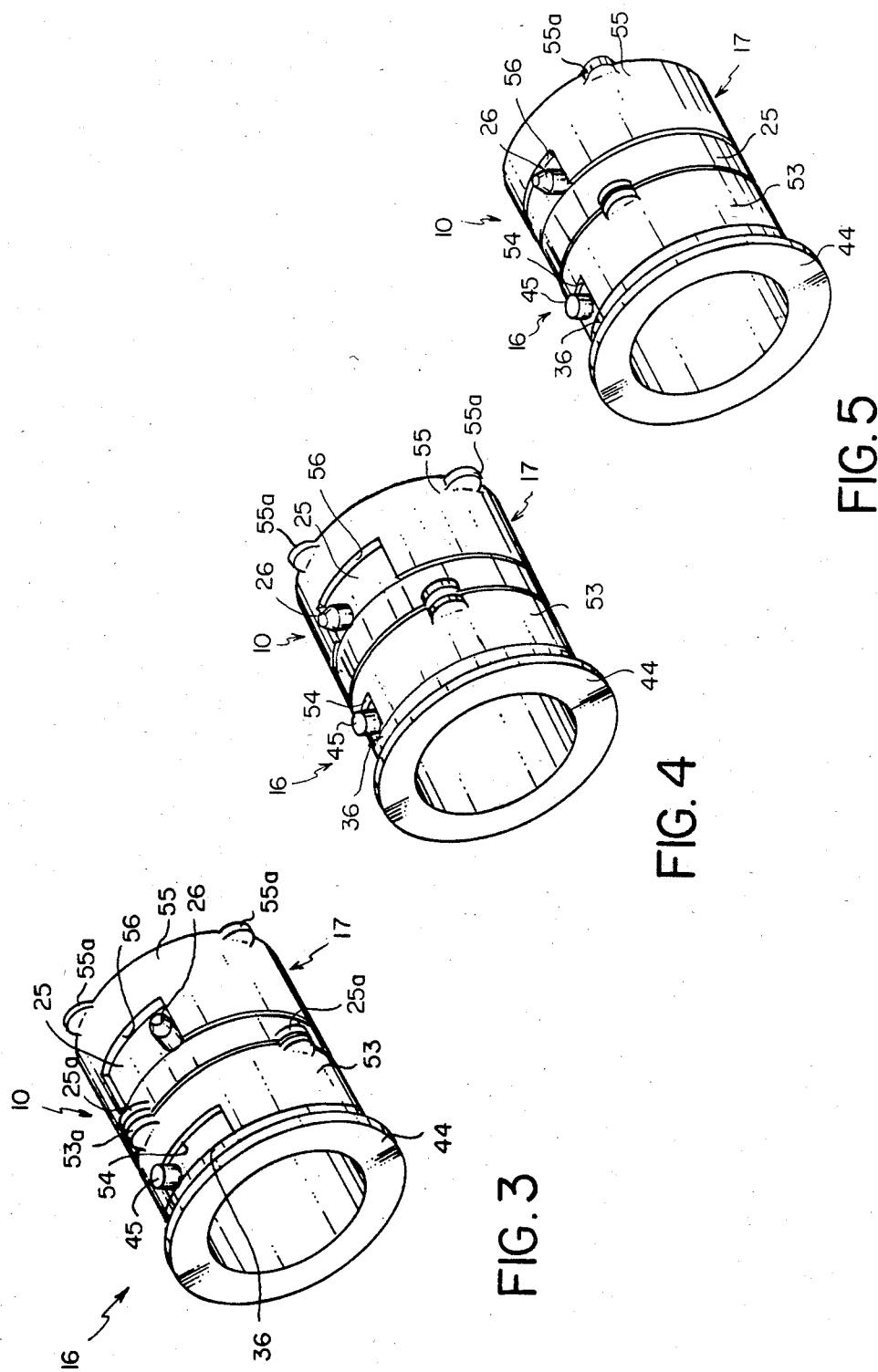
FIGS. 3 through 5 are perspective views showing various operational positions of the reel assembly apparatus.

FIG. 3 shows the coaxial reel assembly apparatus 10 positioned to receive the inboard reel. For that purpose, the clamping projections 53a and 55a are aligned with the extensions 25a of the outboard drive spindle 17. Additionally, the member 36 is rotated relative to the sleeve 53 so that the drive pin 45 of the inboard drive spindle 16 is aligned with one of the three sets of aligned clamping projections. When the assembly apparatus 10 is positioned as such, the bevelled drive pin 26 of the outboard drive spindle 17 is positioned at the right hand side of the notch 56, and the drive pin 45 of the inboard drive spindle 16 is positioned at the left hand side of the peripheral notch 54.

To load the inboard reel, its keyways are aligned with the clamping projections. As the inboard reel is moved axially inboard onto the inboard drive spindle 16, the reel rides over the bevelled surface of the drive pin 26, thereby depressing it against the influence of the spring 27.

The problem now arises to ensure that the inboard reel is retained axially on the drive spindle 16. This problem is solved by rotating the sleeve 53 relative to the inboard reel, so that each clamping projection 53a is no longer aligned with a keyway of the inboard reel. To that end, the outer diameter of the sleeve 53 is slightly smaller than the diameter of the central hub of its tape reel. Also, because of the peripheral notch 54, the sleeve 53 can be rotated in a clockwise direction as viewed from the outboard end) relative to the drive pin 45, and thereby relative to the inboard reel. With a maximum rotation of the sleeve 53 relative to the inboard reel (60 degrees), the drive pin 45 is now located at the right hand side of the peripheral notch 54, as shown in FIG. 4.

FIG. 4 also shows the outboard drive spindle 17 positioned to receive the outboard reel. To that end, the member 25 is rotated in a clockwise direction (viewed from the outboard end), relative to the sleeve 55, to position the pin 26 at the left hand side of the notch 56. This rotation serves two purposes. First, the drive pin 26 is moved into alignment with one of the clamping projections 55a. At this position, the drive pin 26 can mate with a keyway of the outboard reel. Second, the extensions 25a are rotated from alignment with the clamping projections 55a. In this position, the extensions 25a serve to retain the outboard reel axially on the outboard drive spindle 17, and thereby prevent the outboard reel from rubbing against the inboard drive spindle 16.

Once the outboard reel is loaded, it must be retained axially at the opposite end of the drive spindle 17. This is achieved by rotating the sleeve 55 relative to the outboard reel, so that each of the clamping projections 55a is no longer aligned with a corresponding one of the keyways of the outboard reel. To that end, the sleeve 55, like the sleeve 53, has an outer diameter that is slightly smaller than the diameter of the central hub of its associated reel. Also, because of the oversized notch 56, the sleeve 55 can be rotated in a clockwise direction (as viewed from the outboard end) relative to the drive pin 26, and thereby relative to the outboard reel. With a maximum rotation of the sleeve 55 relative to the outboard reel (60 degrees), the drive pin 26 is now relocated at the right hand side of the notch 56, as shown in FIG. 5. The projection 55a shown in FIG. 5 is not the same one shown in FIG. 4, but the next one to appear as the sleeve 55 is rotated.

A further problem now arises in ensuring that both reels are secured to their respective drive spindles so that the reels do not wobble or slip axially during a tape transport operation. The latter problem is aggravated because the drive spindle 16 and the hub of the inboard reel are obscured from the view of an operator by the drive spindle 17 and outboard reel. The invention requires, however, that the coaxial tape reels may be readily mounted and clamped to their respective drive assemblies from the outboard side of the assembly with ease and convenience. The structure by which this is achieved is best described and understood with reference to FIG. 2 and FIG. 6 of the drawings.

For the purpose of clamping the inboard reel, the illustrated embodiment of the invention includes an internal locking nut 60 extending radially in the plane of the inboard reel from the drive spindle 16 into threading engagement with the sleeve 53. The nut 60 functions both to rotate the sleeve 53 and to move the sleeve axially, relative to the member 36. The rotating of the sleeve 53 relative to the member 36 serves to permit the loading of the inboard reel, as described previously with regard to FIGS. 3 and 4. The moving of the sleeve 53 axially is done to clamp the inboard reel between the flange 44 and the clamping projections 53a.

Figure 6:
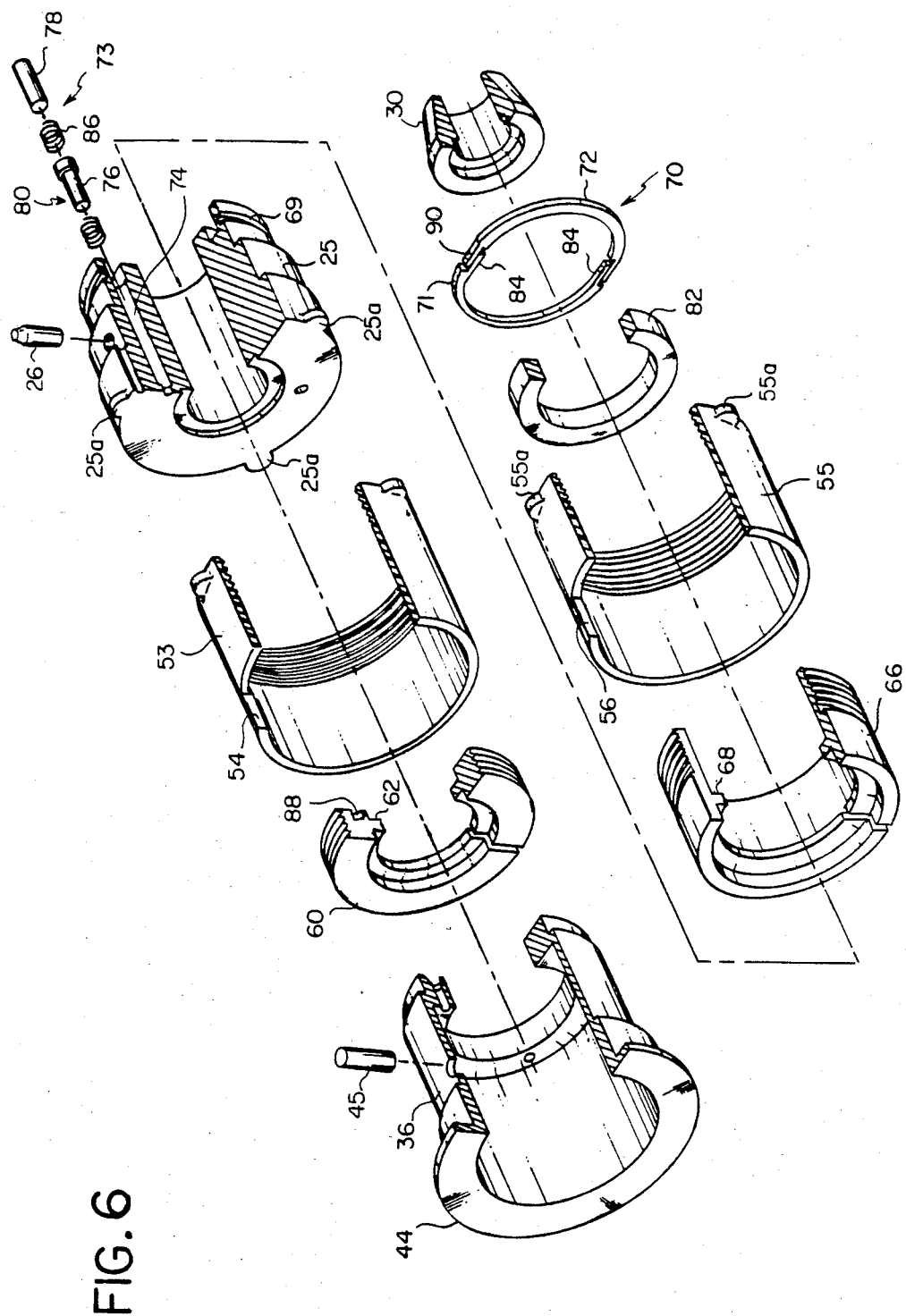
FIG. 6 is an exploded perspective view of the reel assembly apparatus, with a portion of most components removed, for clarity of illustration.

For those purposes, the nut 60 includes an inner, circumferential tongue 62 seated in a circumferential groove 64 of the sleeve 38, to retain the nut in a fixed axial position. To insert the tongue 62 in the groove 64, the nut 60 is split into two halves during assembly, as shown in FIG. 6. Also during assembly, the sleeve 53 is threaded onto the nut 60 so that the drive pin 45 is contained between the side edges of the peripheral notch 54.

For the purpose of clamping the outboard reel, a locking nut 66 is threaded onto the sleeve 55. Like the nut 60, the locking nut 66 serves two purposes. First, the nut 66 functions to rotate the sleeve 55 relative to the member 25. As described with regard to FIGS. 3 through 5, the rotating of the sleeve 55 relative to the member 25 is done to permit the outboard loading of the reels. Second, the nut 66 serves to move the sleeve 55 axially relative to the member 25. The axial movement of the sleeve 55 is done for the purpose of clamping the outboard reel between the extensions 25a of the member 25 and the clamping projections 55a.

For those purposes, the nut 66, similarly to the locking nut 60, includes a circumferential tongue 68, which is seated in a circumferential groove 69 of the member 25, to retain the nut 66 in a fixed axial position. For this mounting arrangement, the nut 66, like the nut 60, is split into two halves during assembly. Similarly, during assembly the sleeve 55 is threaded onto the nut 66 so that the drive pin 26 is contained within the notch 56.

The illustrated embodiment of the invention also includes reel-mounting means 70, accessible to an operator at the outboard side of the reel assembly apparatus 10, for selectively rotating the locking nuts 60 and 66. For those purposes, a pair of commonly hinged bails 71 and 72 are mounted at the outboard side of the shaft 20.

An inboard bail, the bail 71, is arranged be coupled to the internal locking nut 60 by means of an identical pair of spring-loaded linkages 73 seated within spaced channals 74 extending axially through the rotatable member 25 of the outboard drive spindle 17.

Each linkage 73 includes a pair of axially aligned push pins 76 and 78, which are biased by a spring mechanism 80 toward the outboard end of the shaft 20. A push ring 82 serves to push the linkages 73 toward the inboard end of the shaft 20 in response to pivoting movement of an extension 84 of the inboard bail 71. A separator spring 86 of the mechanism 80 functions to permit the moving of the pin 78 axially relative to the inboard push pin 76. This relative movement permits the push pin 76 to ride against the surface of the locking nut 60 if the channels 74 are not aligned with corresponding pin-receiving recesses 88 on the locking nut 60.

An outboard bail, the bail 72, is coupled directly to the locking nut 66 by means of bail hinge 90.

In view of the foregoing, the mounting of the tape reels using the coaxial reel assembly apparatus of the invention will now be described with particular reference to FIGS. 3 through 6 of the drawings.

To mount the inboard reel, the inboard and outboard drive spindles 16 and 17 must be positioned as shown in FIG. 3. Because the inboard and outboard drive spindles are rotatable independently of each other, this is accomplished expeditiously by an operator rotating the sleeves 55 and 53, and the drive pin 45, into alignment with the extensions 25a, as shown in FIG. 3.

Once the inboard reel is slidably positioned on the inboard drive spindle 16, the reel is axially retained on the inboard drive spindle by rotating the sleeve 53 in the clockwise direction to the position shown in FIG. 4. With the reel on the inboard drive spindle 16, this is accomplished by using the reel-mounting means 70, as follows:

The operator lifts the inboard bail 71. The lifting of the bail 71 causes bail extension 84 to pivot, and thereby drive the push ring 82 axially toward the inboard end of the shaft 20. This movement of the ring 82 pushes the linkages 73 axially, so that the end of each of the inboard push pins 76 abuttingly engages the locking nut 60.

If the channels 74 of the outboard drive spindle 17 happen to be aligned with the pin-receiving recesses 88 of the locking nut 60, each push pin 76 would be driven into its pin-receiving recess 88.

If there is misalignment, on the other hand, the operator then proceeds to turn the bail 71 in its raised position. The turning of the bail 71 is accomplished while the operator holds the inboard reel against rotating movement, and thereby prevents the rotating of the drive pin 45 and the member 36. In response to the turning of the bail 71, the linkages 73 rotate together with the push ring 82. By turning the bail 71, the member 25 also rotates under the influence of the linkages 73.

When the channels 74 rotate into alignment with the recesses 88, the inboard pins 76, under the influence of the push ring 82, are pushed into their respective recesses 88. When this happens, the inboard bail 71 is positively coupled to the locking nut 60, through the linkages 73. Thus, further turning of the inboard bail 71 causes the rotating of the nut 60.

By the operator continuing to hold the inboard reel against rotating movement while turning the bail 71 in the clockwise direction, the sleeve 53 rotates with the locking nut 60, relative to the drive pin 45, under the influence of friction forces between the nut and the sleeve.

As the sleeve 53 turns, the projections 53a are rotated from alignment with the keyways of the inboard reel, and thereby serve to contain the inboard reel axially on the inboard drive spindle 16. Once the right hand edge of the peripheral notch 54 abuttingly engages the drive pin 45, as shown in FIG. 4, the sleeve 53 is secured against further movement in the clockwise direction relative to the inboard drive spindle 16. Thus, further turning of the locking nut 60, under the influence of turning movement of the bail 71, drives the sleeve 53 axially toward the inboard end of the shaft 20. This axial movement causes the clamping extensions 53a to push the inboard reel axially into clamping engagement with the flange 44, thereby positively coupling the inboard reel to the drive spindle 16.

With the rotating of the member 25 in response to the turning of the inboard bail 71, the drive pin 26 moves from the right hand side to the left hand side of the notch 56. With the clamping of the inboard reel, the relationship between the respective angular positions of the clamping projections 53a and the corresponding extensions 25a is random at this stage. This is because each clamping projection 53a stops after rotating 60°, whereas each extension 25a continues to rotate as the threaded sleeve 53 is tightened for axial clamping of the inboard reel. During the axial clamping of the inboard reel, the drive pin 26 is automatically positioned at the left hand side of the notch 56, as shown in FIG. 4, to receive the outboard reel. Once the drive pin 26 engages the left hand side of notch 56, the sleeve 55 rotates together with the member 25, thereby maintaining the drive pin 26 in its reel-receiving position.

The outboard reel is clamped to the drive spindle 17, as follows: While holding the outboard reel against turning movement, the operator lifts the outboard bail 72, and rotates it in a clockwise direction. The inner diameter of the bail 72 is slightly larger than the outer diameter of the push ring 82 so that the end of the bail passes free of the ring. The locking nut 66 rotates in the clockwise direction in response to the turning of the bail 72. The sleeve 55 also turns in the clockwise direction, under the influence of friction forces with the nut 66, until the right hand edge of the notch 56 reengages the drive pin 26, as shown in FIG. 5. Thus, the clamping extensions 55a are rotated from alignment with the drive pin 26, and thus from alignment with the keyways of the outboard reel.

When the drive pin 26 secures the sleeve 55 against further rotation relative to the member 25, further rotating of the lock nut 66, in response to the turning of the outboard bail 72, drives the sleeve 55 axially toward the inboard end of the shaft 20. This axial movement causes the extensions 55a to press the outboard reel axially against the drive spindle extensions 25a, thereby clamping the outboard reel to the drive spindle 17.

The invention has been described in detail with reference to the figures. However, it will be appreciated that variations and modifications are possible within the spirit and scope of the invention.

What is claimed is:

1. In coaxial reel assembly apparatus for mounting a first tape reel on a first reel hub for synchronous rotation with an inboard drive spindle located adjacent a reference structure, and for coaxially mounting a second tape reel on a second reel hub for synchronous rotation with an outboard drive spindle remote from said reference structure, each tape reel having a central hub opening including at least one radially projecting keyway extending axially through the tape reel, the improvement comprising:
    (a) said inboard hub being mounted for both axial and rotational movement relative to said inboard drive spindle, said inboard hub further having at least one clamping projection adapted for axial passage through a reel keyway during the loading of the inboard reel onto the inboard hub from the outboard side of said reel assembly apparatus;
    (b) first and second actuatable control means accessible to an operator at the outboard side of said outboard drive spindle;
    (c) a rotatably mounted locking nut extending radially in the plane of the inboard reel between said inboard drive spindle and said inboard hub;
    (d) linkage means extending axially through said outboard drive spindle and, responsive to the actuating of said first control means, causing the rotating of said locking nut which effects (1) an initial rotational movement of said inboard hub relative to said inboard drive spindle and thereby relative to the inboard reel, to move said clamping projection of said hub from alignment with a keyway of the inboard tape reel, and (2) a subsequent axial movement of said inboard hub relative to said inboard drive spindle, to cause said inboard hub to clamp the inboard reel between a radially extending member of said inboard drive spindle and said clamping projection; and (e) means, responsive to the actuating of said second control means, for clamping the outboard reel to said outboard drive spindle.

2. Coaxial reel assembly apparatus as defined in claim 1 wherein
   (a) said inboard drive spindle carries a drive member extending radially into a keyway of the inboard reel, to rotate the inboard reel in synchronism with said inboard drive spindle;
   (b) said inboard hub includes an aperture through which said drive member passes, the aperture being oversized with respect to said drive member, to permit both limited rotational movement and axial movement of said inboard hub relative to said inboard drive spindle, free from blocking engagement with said drive member; and
   (c) said locking nut being responsive to rotating movement of said linkage means (1) for causing the rotational movement of said inboard hub under the influence of friction forces between said locking nut and said inboard hub so long as said inboard hub is free from blocking engagement with said drive member, and (2) for causing the axial movement of said inboard hub under the influence of rotational movement of said locking nut when said inboard hub is rotated into blocking engagement with said drive member.

3. Coaxial reel assembly apparatus as defined in claim 2 wherein said locking nut includes a tongue seated within a circumferential groove of said inboard drive spindle, to maintain said locking nut in a fixed axial position during its rotational movement in response to said linkage means.

4. Coaxial reel assembly apparatus as defined in claim 1 wherein said linkage means further includes a spring-loaded mechanism extending axially through said outboard drive spindle between said first control means and said locking nut.

5. Coaxial reel assembly apparatus as defined in claim 4 wherein said spring-loaded mechanism includes a first push pin axially aligned with a second push pin, and an intermediate spring separating said pins, to permit movement of said pins in the axial direction relative to each other.

6. Coaxial reel assembly apparatus as defined in claim 5 wherein said spring-loaded mechanism is arranged in a channel extending axially through said outboard drive spindle, said spring-loaded mechanism being moved in an axial direction into engagement with said locking nut in response to an initial lifting movement of said first control means, and being moved in an angular direction in response to a subsequent turning movement of said first control means.

7. Coaxial reel assembly apparatus as defined in claim 6 wherein said first control means comprises a bail.

8. Coaxial reel assembly apparatus as defined in claim 6 wherein said locking nut includes a pin-receiving recess arranged for receiving said first push pin of said spring-loaded mechanism when said channel of said outboard drive spindle is aligned with said pin-receiving recess.

9. Coaxial reel assembly apparatus as defined in claim 8 wherein said intermediate spring permits said first push pin to ride on the surface of said locking nut during the turning movement of said first control means when said channel is misaligned with respect to said pin-receiving recess.

10. In coaxial reel assembly apparatus for mounting a first tape reel on a first reel hub for synchronous rotation with an inboard drive spindle located adjacent a tape deck, and for coaxially mounting a second tape reel on a second reel hub for synchronous rotation with an outboard drive spindle remote from said tape deck, each tape reel having a central hub opening including at least one radially projecting keyway extending axially through the tape reel, the improvement comprising:
   (a) each hub being mounted for both axial and rotational movement relative to its respective drive spindle, with each of said hubs having at least one clamping projection adapted for axial passage through a reel keyway during the loading of the tape reels onto their respective hubs from the outboard side of said reel assembly apparatus;
   (b) first and second actuatable control means accessible to an operator at the outboard side of said outboard drive spindle;
   (c) a first rotatably mounted locking nut extending radially in the plane of the inboard reel from said first drive spindle into threading engagement with said inboard hub;
   (d) linkage means extending axially through said outboard drive spindle and, responsive to the actuating of said first control means, causing the rotating of said locking nut which effects (1) an initial rotational movement of said inboard hub relative to said inboard drive spindle and thereby relative to the inboard reel, to move its clamping projection from alignment with a keyway of the inboard tape reel, and (2) a subsequent axial movement of said inboard hub relative to said clamping projection of said inboard hub; inboard drive spindle, to cause said inboard hub to clamp the inboard reel between a radially extending member of said inboard drive spindle and said clamping projection of said inboard hub;
   (e) a second rotatably mounted locking nut extending radially in the plane of the outboard reel from said second drive spindle into threading engagement with said second hub, said second locking nut being arranged for rotating movement in response to the actuating of said second control means, for effecting (1) an initial rotational movement of said outboard hub relative to said outboard drive spindle and thereby relative to the outboard reel, to move its clamping projection from alignment with a keyway of the outboard tape reel, and (2) a subsequent axial movement of said outboard hub relative to said outboard drive spindle, to cause said outboard hub to clamp the outboard reel between a radially extending member of said outboard drive spindle and said clamping projection of said outboard hub.

11. Coaxial reel assembly apparatus as defined in claim 10 wherein said radially extending member of said outboard drive spindle is adapted for axial passage through a reel keyway of the inboard reel during its loading and unloading from the outboard side of said reel assembly apparatus.

* * * * *

UNITED STATES PATENT OFFICE
CERTIFICATE OF CORRECTION

PATENT NO. : 4,592,522
DATED : June 3, 1986
INVENTOR(S) : F. F. Grant

It is certified that error appears in the above-identified patent and that said Letters Patent are hereby corrected as shown below:

Column 10, Line 41    Please delete "clamping projection of"

Column 10, Line 42    Please delete "said inboard hub;"

Signed and Sealed this

Nineteenth Day of August 1986

[SEAL]

Attest:

DONALD J. QUIGG

Attesting Officer

Commissioner of Patents and Trademarks